U. ANCTIL.
NOSTRIL PROTECTOR FOR HORSES.
APPLICATION FILED OCT. 16, 1909.
960,142.
Patented May 31, 1910.
2 SHEETS—SHEET 2.
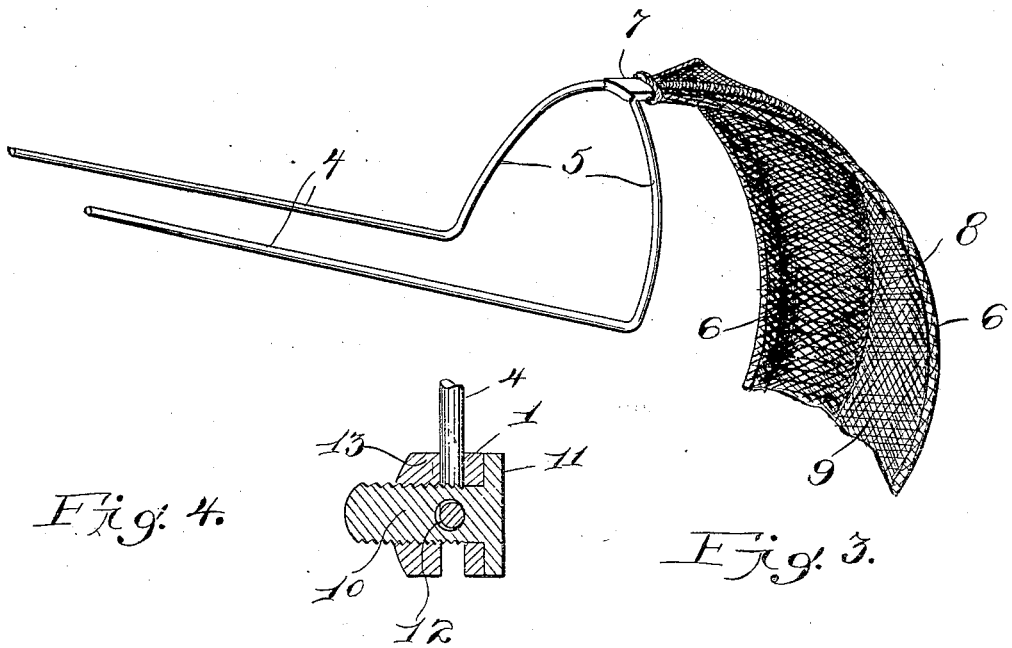
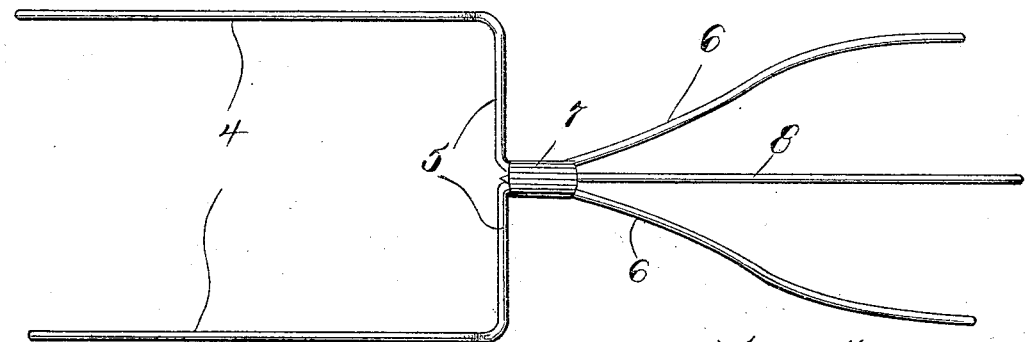
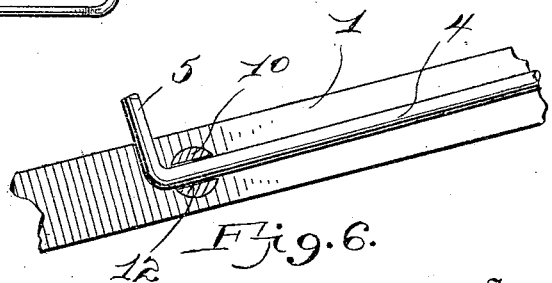
Witnesses
Inventor
Ulric Anctil.
his Attorney.

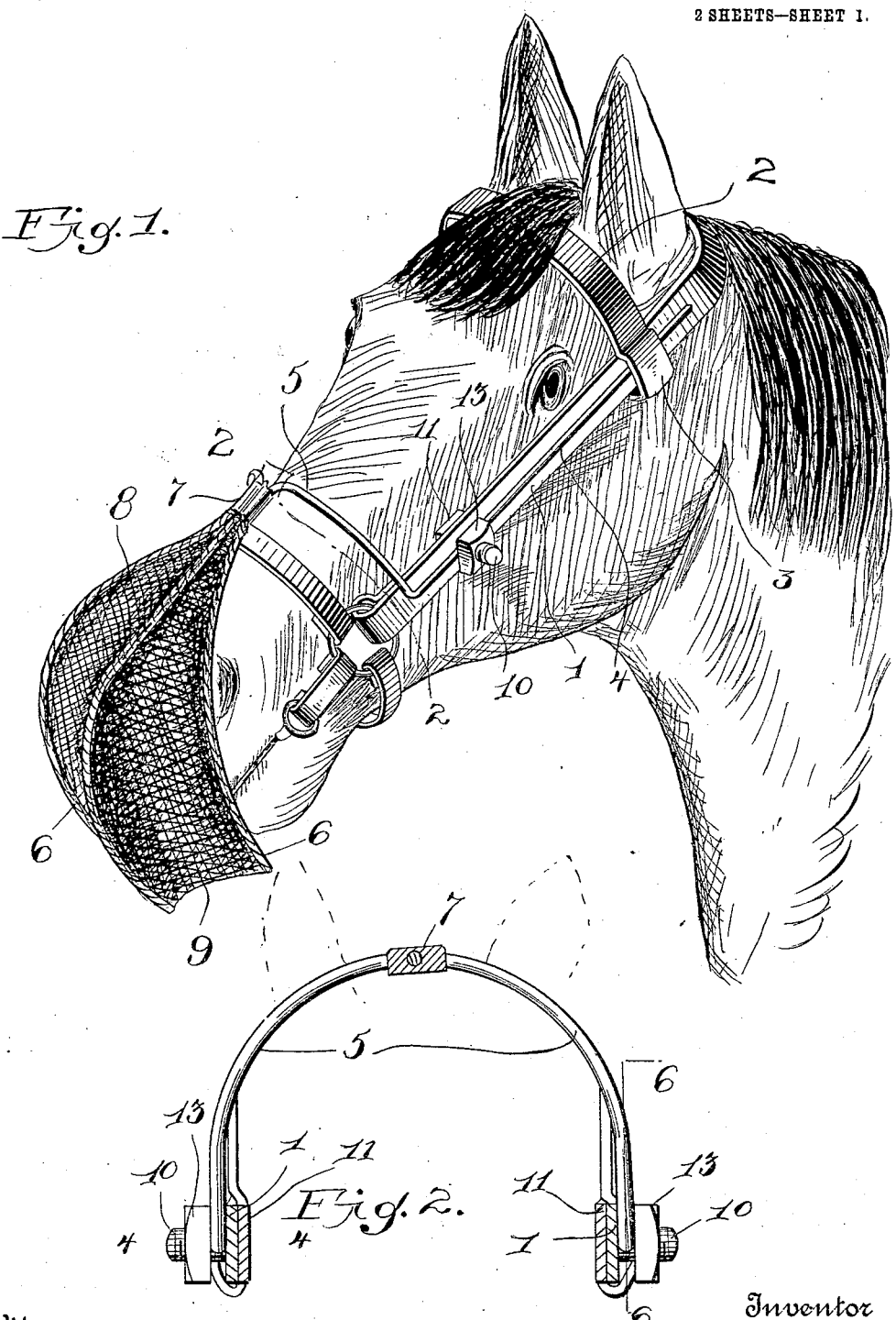

UNITED STATES PATENT OFFICE.

ULRIC ANCTIL, OF PITTSFIELD, MAINE.

NOSTRIL-PROTECTOR FOR HORSES.

960,142.  Specification of Letters Patent.  Patented May 31, 1910.

Application filed October 16, 1909. Serial No. 522,955.

*To all whom it may concern:*

Be it known that I, ULRIC ANCTIL, a citizen of the United States, residing at Pittsfield, in the county of Somerset and State of Maine, have invented certain new and useful Improvements in Nostril-Protectors for Horses, of which the following is a specification, reference being had therein to the accompanying drawing.

This invention relates to protectors for horses, particularly for use when traveling rapidly, and the principal object of the same is to provide a protector that will be retained in spaced relation to the horse's nostril so that, when speeding, the force of the air will be broken, thereby permitting natural breathing of the animal.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved protector, showing the same applied to a horse. Fig. 2 is a sectional view taken on the line 2—2, Fig. 1. Fig. 3 is a detail perspective view of the protector, detached. Fig. 4 is a horizontal sectional view taken on the line 4—4, Fig. 2. Fig. 5 is a top plan view of the frame of the protector. Fig. 6 is a fragmentary sectional view taken on the line 6—6, Fig. 1.

Referring to said drawings by numerals, 1 designates the cheek straps of a bridle with which the usual brow band 2 has the loop engagement 3.

The improved protector is composed of a resilient frame formed of three lengths of resilient wires, the two outer wires having a straight arm 4 which lies in contact with and parallel with the outer surface of the cheek straps 1 and has its upper end passed through the loop 3 of the head stall 2. The lower portion of each arm 4 is inturned as indicated at 5 and bowed outwardly to conform to the contour of the animal's face above the nostril, and are thence continued downwardly and outwardly on an easy curve, as indicated at 6, in conformity to the curvature of the animal's nostril and mouth, said portion 6 terminating in flaring ends. At the point of junction of the inturned portion 5 and the downward and outward curved portion 6, the two wires are connected by a clamping clip 7 which also holds one end of a central wire 8, which is also curved to conform to the contour of the animal's nostril and mouth.

As will be understood, from the foregoing, the frame which overhangs the nostril and mouth has a contracted upper portion and a widened flaring concaved major portion, which extends well below the mouth. Said frame is covered by light but dust and air proof textile fabric 9 which is stitched or otherwise fastened to the portions 6 of the outer wires and the central wire 8.

The arms 4 are rigidly, but adjustably clamped to the cheek straps 1 by the threaded bolts 10 which pass through said straps and are provided with a wide flat head 11 so that contact of the same with the animal's head will not injure the animal. Said bolts are also provided with a transverse opening 12 through which said arms 4 pass, and are adjustably clamped against the said cheek straps by the nuts 13 of said bolts 10.

It will be seen from the foregoing that the improved protector, by means of the described frame and attaching arms may be detachably held in engagement with a bridle so that the fabric covered frame will be retained over and in spaced relation to the animal's nostril and mouth, thereby preventing the rush of air incidental to rapid travel coming in contact with either the nostril or the mouth with the usual nostril distending result and the consequent reduction in speed.

What I claim as my invention is:—

1. A protector comprising a pair of outer wires shaped to provide bridle engaging arms and having their lower portions inturned and then bent downward and outward, a central wire curved downward and outward, a clamp for fastening the upper end of said central wire to the upper portion of said downwardly and outwardly curved portions of the outer wires, and a fabric covering for the central wire and said downwardly and outwardly curved portions of the outer wires.

2. In a device of the character described, the combination with the cheek straps of a bridle, of a nostril protector having attaching arms, bolts projecting through said straps and each provided with an opening for said arms, and a lock nut for each bolt.

3. In a device of the character described, the combination with the cheek straps of a bridle, of threaded bolts passed therethrough and each provided with a transverse opening, a wide flat head for each bolt, a nostril protector having straight attaching arms which pass through said bolt openings, and a lock nut for each bolt for adjustably clamping said arms to said cheek straps.

4. A device of the character described comprising a frame composed of a pair of outer wires and an inner wire, the inner wire having its upper end connected to the outer wires, and said outer wires being outwardly bent above their point of connection with the inner wire to provide attaching arms, and a cover for said frame.

In testimony whereof I hereunto affix my signature in presence of two witnesses.

ULRIC ANCTIL.

Witnesses:
FREDERICH. E. MAYO,
JAMES WILLIAM HOUSTON.